April 23, 1957  O. W. BONNAFE  2,789,686
WORK CARRIER CONVEYOR

Filed Oct. 20, 1954  2 Sheets-Sheet 1

INVENTOR.
OLIVER W. BONNAFE.
BY Charles T. Hawley
ATT'Y

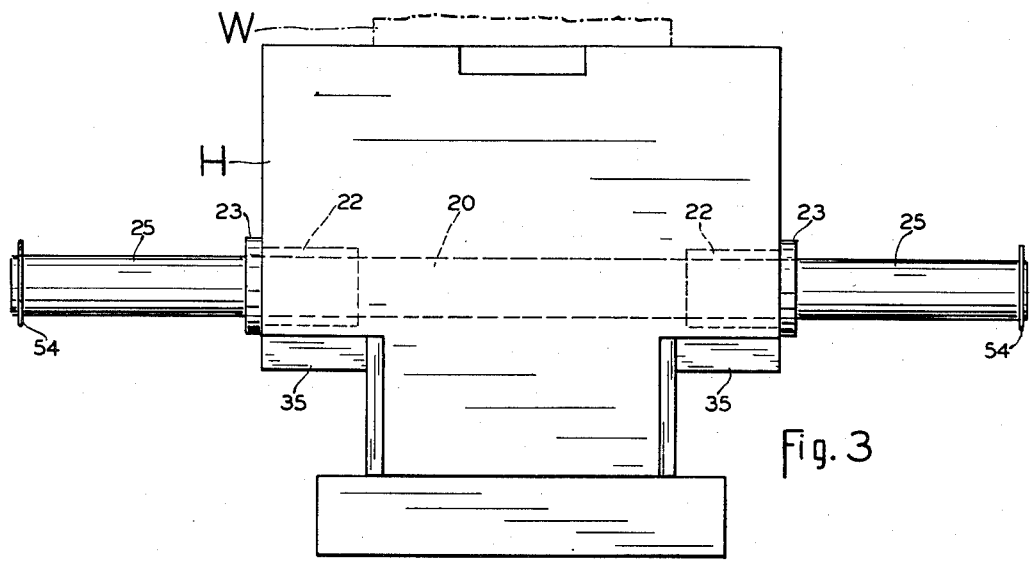
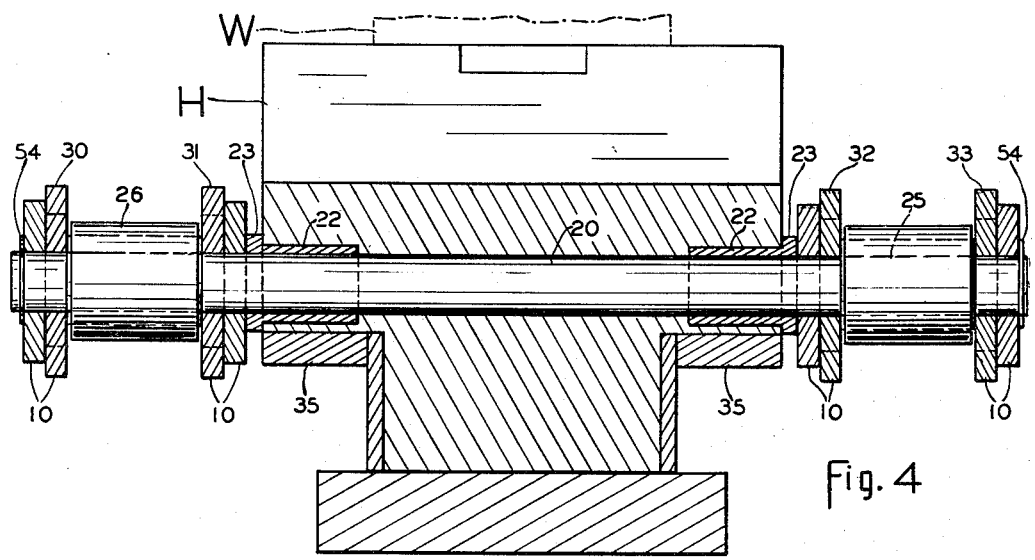
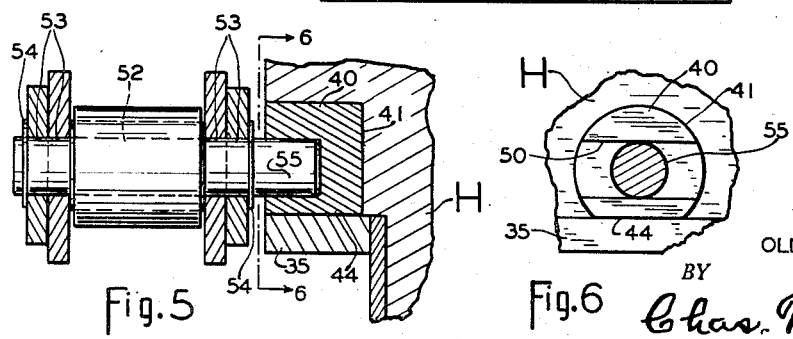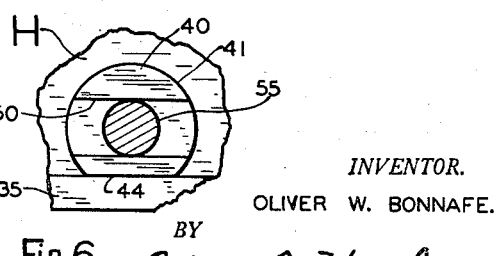

United States Patent Office 2,789,686
Patented Apr. 23, 1957

2,789,686

WORK CARRIER CONVEYOR

Oliver W. Bonnafe, Hudson, Mass., assignor to The Lapointe Machine Tool Company, Hudson, Mass., a corporation of Maine Application October 20, 1954, Serial No. 463,491

2 Claims. (Cl. 198—189)

This invention relates to a machine tool of the type in which a plurality of work-holders are moved successively in a closed path and past a selected point at which a machine tool operation, such as broaching, milling or grinding, is performed on successive workpieces. Such workholders are commonly mounted on pairs of parallel conveyor chains and are pivotally connected at their front ends to cross shafts extending through the holders and through certain chain links at each side thereof. Each holder is slidable on a fixed supporting structure during its forward travel.

It is the general object of this invention to provide improved means to additionally attach the trailing end portion of each workholder to the conveyor chains in such manner that the workholder cannot swing away from the chains during the lower return run of the chains and the inverted attached holders.

I also provide means for attaching the trailing ends of the holders to the chains in such manner that they will not interfere with the travel of the chains in sharply curved paths.

My invention further relates to arrangements and combinations of parts which will be hereinafter described and more particularly pointed out in the appended claims.

A preferred form of the invention is shown in the drawings, in which—

Fig. 3 is an end elevation, looking in the direction of the arrow 3 in Fig. 2;

Fig. 4 is a sectional end elevation, taken along the line 4—4 in Fig. 2;

Fig. 5 is a detail sectional end elevation, taken along the line 5—5 in Fig. 2; and Fig. 6 is a detail sectional view, taken along the line 6—6 in Fig. 5.

Figure 1:
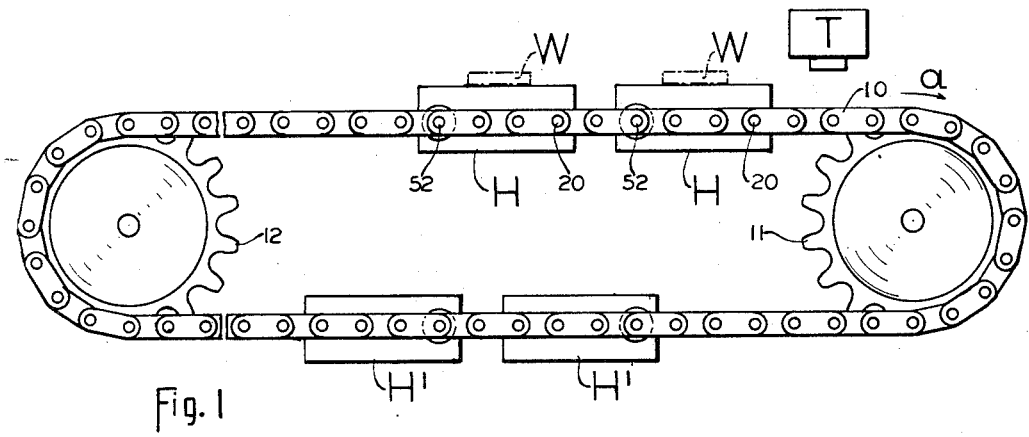
Fig. 1 is a diagrammatic side elevation showing my improved work carrier assembly.

Referring to Fig. 1, I have shown pairs of conveyor chains 10 mounted on pairs of sprockets 11 and 12 which are positively rotated to advance the chains as indicated by the arrow a. Workholders H are mounted on the chains 10 and are commonly provided in spaced relation along the entire lengths of the chains. Two holders H are shown on the upper or operative run of the chains 10, and two inverted holders H' on the lower idle or return run. It will be understood that additional holders are used in practice.

A machine tool is indicated diagrammatically at T and is designed to perform a desired machine operation on a piece of work W as it passes the machine tool.

At the end of the upper or operative run, the finished workpiece W may be discharged, and at the lefthand or approach end of the operative run, fresh workpieces may be supplied to the holders H. Machines of this general type and operating as described are in common use.

My present invention relates to the attachment of the holders H to the chains 10.

Figure 2:
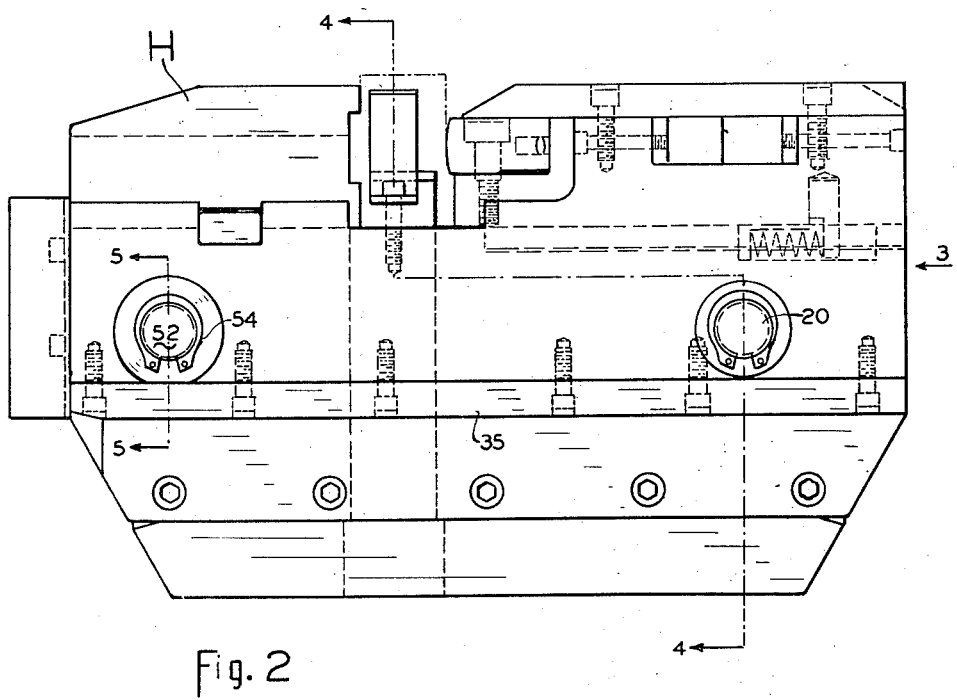
Fig. 2 is a side elevation of one of the work carriers.

Referring to Figs. 2, 3 and 4, each holder H is pivotally connected to the chains 10 by a cross shaft 20 which extends cross-wise of the holder H and which may be provided with bushings 22 (Fig. 4) in the opposite sides of the holder. The heads 23 of these bushings space the chain links 10 from the holder H.

Each end of the cross shaft 20 projects beyond the holder H as clearly shown at 25 in Fig. 3 and these projecting end portions 25 extend through bearing openings in certain inside chain links 30, 31, 32 and 33 (Fig. 4). Bushings 26 between adjacent chain links are engaged by the teeth of the sprockets 11 and 12.

Each holder H is thus firmly and pivotally connected with the pairs of chains 10 at the leading end of the holder, and the pull of the chains 10 is applied to the successive holders through their cross shafts 20. Each holder is provided with bearing or wear plates 35 which are positively and slidably supported during the operative run of each holder.

The extreme outside and the extreme inside links of the chains 10 are preferably tight on the cross shafts 20.

At the opposite or trailing end of each holder, slotted bushings 40 (Figs. 5 and 6) are loosely inserted in cylindrical recesses 41 in the sides of each holder. These recesses are cut through at their lower edges as indicated in Fig. 6 to permit a flattened surface 44 of each bushing 40 to firmly engage the top surface of the associated wear plate 35, thus holding the bushing in fixed and predetermined angular position. Each bushing 40 is also provided with an elongated slot or recess 50 into which projects the end 55 of a stud 52 which extends through transverse openings 53 in associated links of the chains 10 and which may be held therein by spring washers 54. These washers 54 are also used on the ends 35 of the shafts 20.

Each pair of studs 52 is commonly separated from its associated cross shaft 20 by several link spaces, as indicated in Figs. 1 and 2, and the end portion 55 of each stud 52 is slidable lengthwise of the chains 10 in a slot or recess 50.

With this construction, it will be clear that both ends of each holder are firmly supported during both the operative run and the idle return run. It will also be evident that the slots 50 permit relative sliding movements between the ends 55 of the studs 52 and the bushings 40, so that the chord distance between a cross shaft 20 and its associated studs 52 may change and shorten in passing around a sprocket, while at the same time the distance between the bushings 22 and 40 in the holders H remains fixed. The holders H are thus at all times firmly connected at both ends to the conveyor chains, and no loose swinging or flopping of the holders about their cross shafts can occur. Also, the use of sprockets of relatively small diameter is facilitated.

Having thus described my invention and the advantages thereof, I do not wish to be limited to the details herein disclosed, otherwise than as set forth in the claims, but what I claim is:

1. In a work carrier assembly having pairs of conveyor chains and a plurality of associated work carriers, that improvement which comprises pivotal bearing connections between said chains and said work-holders at the leading end of each work-holder, studs mounted on said chains in spaced relation rearward of said leading bearing connections and extending inward beyond the side surfaces of said work-holders, bearing bushings seated in axially-aligned cylindrical recesses in the opposite side portions of said work-holders, and means to hold said bushings from axial and angular displacement in said side portions, and each bearing bushing having its outer end portion transversely channeled parallel to the straight line of travel of said holder and the inner end of one of said chain studs being received in each transverse channel, thereby providing a slidable and lost-motion connection between the trailing end of each work-holder and said conveying chains.

2. The combination in a work carrier assembly as set forth in claim 1, in which each bearing bushing has a flat face at one side and in which each work-holder has wear plates underlying said holder and closely engaging each bearing bushing at said flat side and thereby preventing rotation of said bushing.

References Cited in the file of this patent

UNITED STATES PATENTS

| | | |
|---|---|---|
| 1,384,461 | Halset | July 12, 1921 |
| 2,514,104 | Sutherland | July 4, 1950 |

FOREIGN PATENTS

| | | |
|---|---|---|
| 636,360 | Great Britain | Apr. 26, 1950 |